(12) United States Patent
Brunel et al.

(10) Patent No.: US 11,151,149 B2
(45) Date of Patent: *Oct. 19, 2021

(54) HIERARCHICAL WINDOW DATABASE QUERY EXECUTION

(71) Applicant: SAP SE, Walldorf (DE)

(72) Inventors: Robert Brunel, Heidelberg (DE); Norman May, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,223

(22) Filed: Oct. 2, 2019

(65) Prior Publication Data

US 2020/0042518 A1 Feb. 6, 2020

Related U.S. Application Data

(63) Continuation of application No. 15/370,938, filed on Dec. 6, 2016, now Pat. No. 10,545,974.

(60) Provisional application No. 62/363,730, filed on Jul. 18, 2016.

(51) Int. Cl.
| | | |
|---|---|---|
| *G06F 16/248* | (2019.01) | |
| *G06F 16/28* | (2019.01) | |
| *G06F 16/2455* | (2019.01) | |
| *G06F 16/901* | (2019.01) | |
| *G06F 16/22* | (2019.01) | |

(52) U.S. Cl.
CPC .......... *G06F 16/248* (2019.01); *G06F 16/221* (2019.01); *G06F 16/2246* (2019.01); *G06F 16/24554* (2019.01); *G06F 16/284* (2019.01); *G06F 16/9024* (2019.01)

(58) Field of Classification Search
CPC .. G06F 16/248; G06F 16/284; G06F 16/2246; G06F 16/221
See application file for complete search history.

(56) References Cited

U.S. PATENT DOCUMENTS

| | | | |
|---|---|---|---|
| 7,254,584 B1 * | 8/2007 | Addison, Jr. ......... | G06F 16/284 707/999.103 |
| 7,627,537 B2 * | 12/2009 | Lai ........................ | G06N 7/005 706/12 |
| 2004/0015487 A1 * | 1/2004 | Lin ....................... | G06F 16/289 707/999.003 |

(Continued)

FOREIGN PATENT DOCUMENTS

| | | |
|---|---|---|
| JP | 2016-1411 A | 1/2016 |
| WO | WO 2016/027451 A1 | 2/2016 |

OTHER PUBLICATIONS

Notice of Allowance, Japanese Patent Application No. 2017-137809, dated Apr. 19, 2021, 7 pages.

*Primary Examiner* — Kannan Shanmugasundaram
(74) *Attorney, Agent, or Firm* — Klarquist Sparkman, LLP

(57) ABSTRACT

Addressed herein is the problem of expressing and evaluating computations on hierarchies represented as database tables. Engine support for such computations is very limited today, and so they are usually outsourced into stored procedures or client code. Structural grouping is applied to relational algebra to provide concise syntax to express a class of useful computations. Algorithms are also provided to evaluate such structural groupings efficiently by exploiting available indexing schemes. Related apparatus, systems, techniques and articles are also described.

20 Claims, 7 Drawing Sheets

(56) References Cited

U.S. PATENT DOCUMENTS

| | | | | |
|---|---|---|---|---|
| 2007/0094237 A1* | 4/2007 | Mitchell | ............... | G06F 16/275 |
| | | | | 707/999.002 |
| 2012/0179687 A1* | 7/2012 | Liu | ......................... | H04L 63/20 |
| | | | | 707/741 |
| 2014/0172776 A1* | 6/2014 | Liu | ....................... | G06F 16/221 |
| | | | | 707/600 |

* cited by examiner

| Inp1 | |
|---|---|
| Node | Value |
| B1 | 10 |
| C1 | 100 |
| C2 | 200 |
| D1 | 1000 |
| D2 | 2000 |
| D3 | 3000 |

| Out1 |
|---|
| A1 |
| B1 |
| C1 |

(a)

| Inp2 | | | |
|---|---|---|---|
| Node | ID | Weight | Value |
| C1 | 'C1' | 0.4 | 100 |
| C2 | 'C2' | 0.6 | 200 |
| B1 | 'B1' | 0.5 | 10 |
| D1 | 'D1' | 0.8 | 1000 |
| D2 | 'D2' | 0.2 | 2000 |
| C3 | 'C3' | 0.25 | NULL |
| D3 | 'D3' | 1.0 | 3000 |
| C4 | 'C4' | 0.75 | NULL |
| B2 | 'B2' | 0.5 | NULL |
| A1 | 'A1' | NULL | NULL |
| A2 | 'A2' | NULL | NULL |

(b)

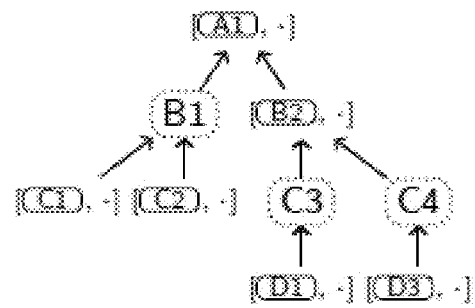
FIG. 3

400

```
(1a) SUM(Value) OVER bu
(1b) RECURSIVE INT(Value + SUM(x) OVER bu) AS x (2a) PRODUCT(Weight) OVER td   -- non-standard
(2b) RECURSIVE INT
        (Weight * COALESCE(FIRST_VALUE(x) OVER td, 1)) AS x (3a) SUM(Value) OVER (bu RANGE 1 PRECEDING EXCLUDE GROUP)
(3b) RECURSIVE (SUM(Value) OVER bu)

(4a) RECURSIVE DOUBLE(Weight * (Value + SUM(x) OVER bu)) AS x
(4b) RECURSIVE DOUBLE(Value + Weight * (SUM(x) OVER bu)) AS x
(4c) RECURSIVE DOUBLE(Value + SUM(Weight * x) OVER bu) AS x
(4d) RECURSIVE DOUBLE(Value
        + SUM(VALUE_OF(Weight AT CURRENT_ROW) * x) OVER w) AS x (5) RECURSIVE VARCHAR(
        COALESCE(FIRST_VALUE(x) OVER td, '') || '/' || ID) AS x (6a) COUNT(*) OVER td
(6b) RECURSIVE INT(COALESCE(FIRST_VALUE(x) OVER td, 0) + 1) AS x (7a) COUNT(*) OVER bu
(7b) RECURSIVE INT(COALESCE(FIRST_VALUE(x) OVER td, 0) + 1) AS x (8) RECURSIVE INT(1 + COALESCE(MAX(x) OVER bu, 0)) AS x (9a) COUNT(*) OVER (bu RANGE 1 PRECEDING EXCLUDE GROUP)
(9b) RECURSIVE (COUNT(*) OVER bu)

(10) RECURSIVE (MY_FUNC(ARRAY_AGG(ROW(ID, x)) OVER w)) AS x
```

FIG. 4

500 

| (1b) | total Value | ↑ | $t.\text{Value} + \sum_{u \in X} u.x$ |
|---|---|---|---|
| (2b) | absolute Weight | ↓ | $t.\text{Weight} * \Pi_{u \in X} u.x$ |
| (3b) | Value sum over <: | ↑ | $\sum_{u \in X} u.\text{Value}$ |
| (4a) | weighted rollup | ↑ | $t.\text{Weight} * (t.\text{Value} + \sum_{u \in X} u.x)$ |
| (4b) | | | $t.\text{Value} + t.\text{Weight} * (\sum_{u \in X} u.x)$ |
| (4c) | | | $t.\text{Value} + \sum_{u \in X} u.\text{Weight} * u.x$ |
| (5) | Dewey conversion | ↓ | $(t.\text{ID})$ if $X = \{\}_b$, $u.x \circ (t.\text{ID})$ if $X = \{u\}_b$ |
| (6b) | level | ↓ | $1 + \sum_{u \in X} u.x$ |
| (7b) | subtree size | ↑ | $1 + \sum_{u \in X} u.x$ |
| (8) | subtree height | ↑ | $1$ if $X = \{\}_b$, else $1 + \max_{u \in X} u.x$ |
| (9b) | degree | ↑ | $|X|$ |

Symbols: ↑ bottom-up ↓ top-down

*FIG. 5*

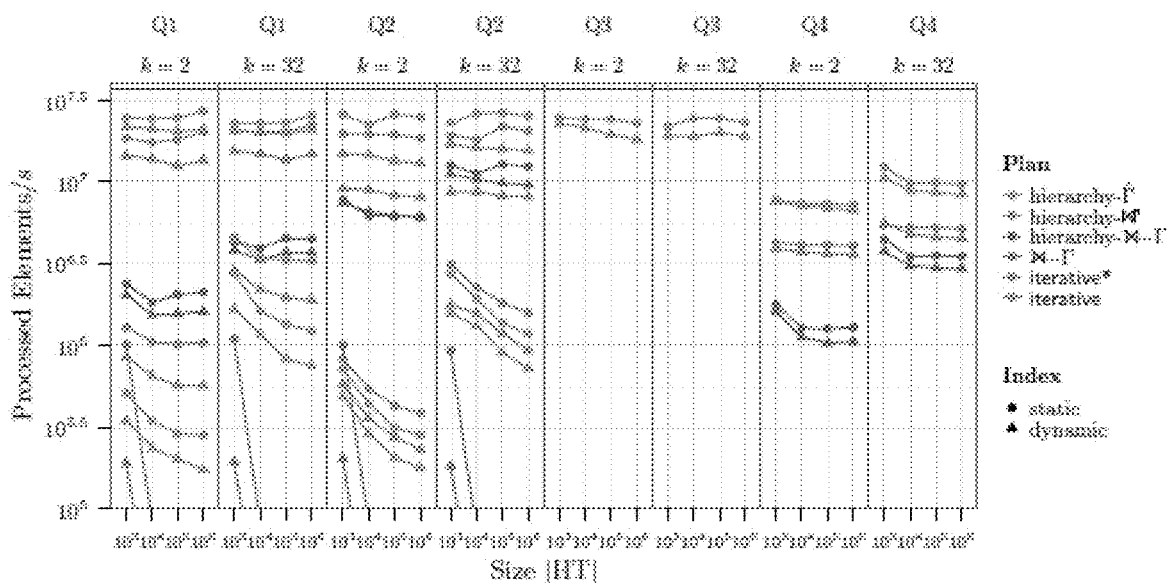
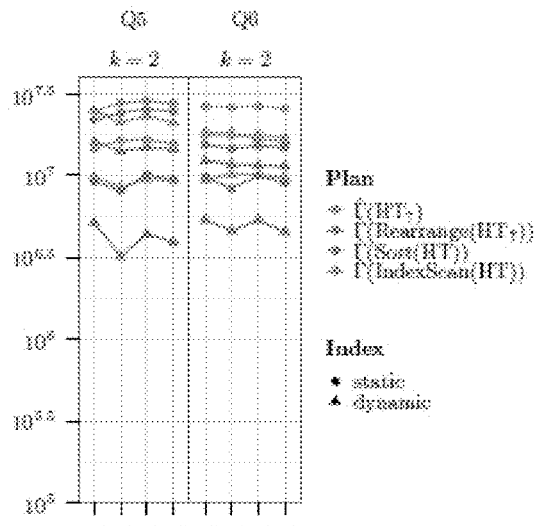
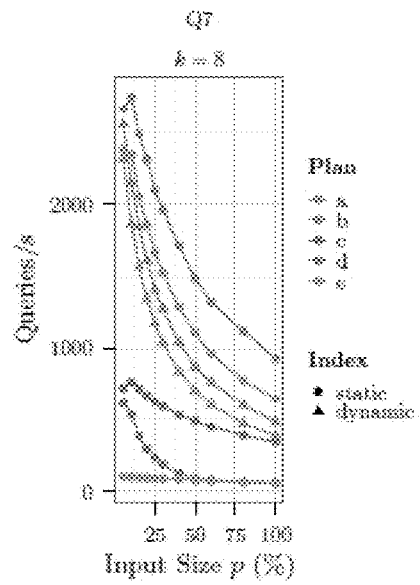
FIG. 6

HIERARCHICAL WINDOW DATABASE QUERY EXECUTION

RELATED APPLICATIONS

The current application claims priority U.S. patent application Ser. No. 15/370,938 filed on Dec. 6, 2016 which, in turn, claims priority to U.S. Pat. App. Ser. No. 62/363,730 filed on Jul. 18, 2016 and entitled: "Index-Assisted Hierarchical Computations in Main Memory Relational Databases", the contents of both of which are hereby fully incorporated by reference.

BACKGROUND

In business and scientific applications hierarchies appear in many scenarios: organizational or financial data, for example, is typically organized hierarchically, while the sciences routinely use hierarchies in taxonomies, say for animal species. In the underlying relational database management systems (RDBMS) they are represented in hierarchical tables using relational tree encodings. Looking at typical queries especially in analytic applications, it is noted that hierarchies serve mainly two purposes. The first is structural pattern matching, i.e., filtering and matching rows based on their positions in a hierarchy. The second is hierarchical computations: propagating measures and performing aggregation-like computations alongside the hierarchical dimension. To address both purposes on RDBMS level, two challenges need to be solved namely (1) how can a user express a task at hand intuitively and concisely in SQL (expressiveness)? and (2) how can the engine process these SQL queries efficiently (efficiency)?

Regarding pattern matching queries, both can be considered adequately solved, as they boil down to straightforward filters and structural joins on hierarchy axes such as "is-descendant", and techniques for appropriate indexes and join operators are well-studied. The same cannot be said of hierarchical computations. For the purpose of computations, a subset of the hierarchy nodes is dynamically associated with values to be propagated or aggregated, and possibly filtered. In analytic applications, this has always been a routine task: Dimension hierarchies are typically modeled by denormalized leveled tables such as City-State-Country-Continent. Certain computations can then be expressed using SQL's basic grouping mechanisms (in particular ROLLUP). However, this is insufficient for computations beyond simple rollups, especially when the hierarchy is not organized into levels but exhibits an irregular structure—where nodes on a level may be of different types—and arbitrary depth. Consider the hierarchy in diagram 100 of FIG. 1. Suppose it is desired to compute weighted sums of some values attached to the leave—show could one state a rollup formula incorporating the edge weights? This quickly turns exceedingly difficult in SQL. One tool that comes to mind are recursive common table expressions (RCTEs). However, more intricate aggregation-like computations tend to result in convoluted, inherently inefficient statements. Lacking RDBMS support, today users resort to stored procedures or client code as workarounds. These are unsatisfactory not only concerning expressiveness, they also ignore the known hierarchy structure and are thus handicapped in terms of efficiency.

SUMMARY

The current subject matter addresses issues of expressiveness and efficiency regarding complex computations on arbitrary irregular hierarchies by enhancing the RDBMS backend. The foundation of the current approach are the data model and SQL constructs which allow the user to conveniently define and query arbitrary hierarchies. This arrangement opens up new opportunities: the backend becomes aware of the hierarchy structure and can rely on powerful indexing schemes for query processing. Below are introduced concepts of hierarchical computations and corresponding SQL constructs, which can be translated into structural grouping operations in relational algebra. The efficient evaluation of structural grouping can requires index-assisted physical algebra operators.

In one aspect, a query is received by a database that requests data in the form of a table in which each row is related to a different node of a hierarchy of nodes, the query specifying a hierarchical window clause and at least one expression containing a window function on a hierarchical window specified by the hierarchical window clause. Thereafter, a directed acyclic graph of at least a portion of the rows in a windowed table is constructed based on the hierarchical window clause. Later, based on expressions specified by the query, results are obtained that are responsive to the query by accumulating data from the rows across edges of the directed acyclic graph. Data can then be provided that includes at least a portion of the obtained results.

The directed acyclic graph can either explicitly constructed or not explicitly constructed.

The hierarchical window clause can specify a row field whose contents represent the position of the row in a hierarchy of nodes; with such an arrangement, the structure of the directed acyclic graph can be derived from the structure of the hierarchy of nodes. The hierarchical window clause can further specify direction of desired data flow across the constructed directed acyclic graph. The direction of desired data flow can follow a direction of edges of the hierarchy of nodes. The direction of desired data flow can follow a direction of inverted edges of the hierarchy of nodes.

The data flow across the directed acyclic graph can bypass at least one intermediate node of the hierarchy of nodes.

Providing data can include one or more of: persisting at least a portion of the obtained results, loading at least a portion of the obtained results into memory, transmitting at least a portion of the obtained results to a remote computing system, or displaying at least a portion of the obtained results in an electronic visual display.

The query can further specify a window partition clause and the data stored in the hierarchy of nodes is partitioned according to the window partition clause. With such an arrangement, the generated directed acyclic graph of the hierarchy of nodes can be based on the partitioned data.

The query can be formulated in different languages/protocols including Structured Query Language (SQL).

The query can include a RECURSIVE keyword wrapping at least one expression having at least one window function over the hierarchical window.

The database can take many different forms including, without limitation, a main-memory relational database management system and/or a column-oriented in-memory database. Further, the database can be a distributed database in which data is stored across multiple computing systems.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter provided herein provides many technical advantages. For example, the current subject matter provides techniques for querying hierarchical data that is more rapid than conventional techniques that also use fewer computational resources.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is a diagram illustrating a bottom-up hierarchical window;

FIG. 4 is a diagram illustrating SQL examples for unary computations;

FIG. 5 is a diagram illustrating definitions of structural aggregation functions corresponding to examples in FIG. 4;

FIG. 6 is a diagram illustrating experimental results; and

DETAILED DESCRIPTION

Figure 1:
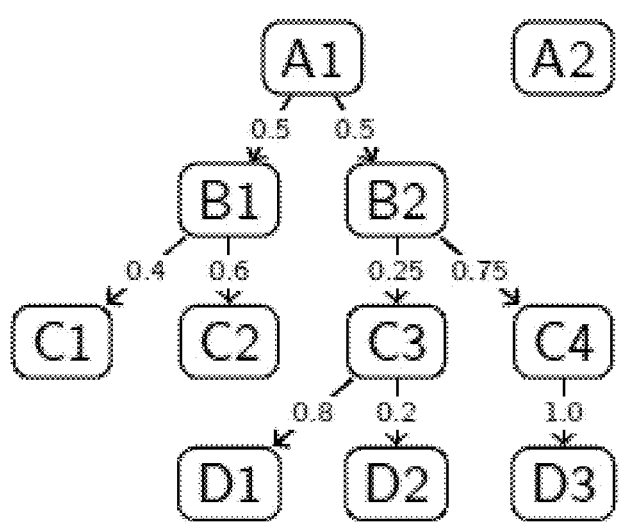
FIG. 1 is a diagram illustrating a sample table HT.

The current subject matter is directed to the querying of hierarchical data stored in a database such as, for example, a relational database management system (RDBMS) including, without limitation, a main-memory RDMBS and/or a column-oriented in-memory database such as the SAP HANA platform. As a starting point, hierarchical data can be represented in a relational table. More specifically, one can assume a table that encodes—using a suitable scheme—a forest of ordered, rooted, labeled trees, such that one table tuple (row) represents one hierarchy node. The labels of a node are the associated row's fields. For trees a 1:1 association between a node and its incoming edge can be made, so each field value can be interpreted as a label on either the node or edge. In the example table HT of FIG. 1, Weight is viewed as an edge label. The ordered property means that siblings have a defined order. It implies that every node has a well-defined rank in the pre- or post-order sequence of all nodes; e. g., B1 in the figure has pre rank 2 and post rank 3. While it can be appreciated that there are many options regarding the actual tree encoding to use, the current discussion of hierarchical computations is encoding-agnostic. The hierarchical table model conveniently hides the encoding details through an abstract data type NODE (the hierarchical table model is described in further detail in The current subject matter is related to the systems, methods, and computer program products described and illustrated in U.S. patent application Ser. No. 14/614,859 entitled "Hierarchy Modeling and Query" filed on Feb. 5, 2015, the contents of which are hereby fully incorporated by reference).

The Node attribute of HT identifies a row's position and is backed by a hierarchy index H, which encapsulates the forest structure. One can assume the index supports at the minimum two basic primitives, is-before-pre and is-before-post, in $\mathcal{O}(\log |HT|)$ or even $\mathcal{O}(1)$. Given a pair $(v_1, v_2)$ of node values, they test whether $v_1$ precedes $v_2$ with respect to pre- and post-order traversal of the hierarchy. This allows one to test pairs of nodes against the main hierarchy axes:

| | |
|---|---|
| preceding: | is-before-pre($v_1$, $v_2$) $\wedge$ is-before-post($v_1$, $v_2$) |
| descendant: | is-before-pre($v_2$, $v_1$) $\wedge$ is-before-post($v_1$, $v_2$) |
| following: | is-before-pre($v_2$, $v_1$) $\wedge$ is-before-post($v_2$, $v_1$) |
| ancestor: | is-before-pre($v_1$, $v_2$) $\wedge$ is-before-post($v_2$, $v_1$) |
| self: | $v_1 = v_2$ |

In HT, C3 follows B1/C1/C2 and precedes A2/C4/D3. The ancestor/descendant and preceding/following axes are symmetric. In pseudo code, one can denote e. g. "H.is-descendant($v_1$, $v_2$)" for an axis check "$v_1$ is a descendant of $v_2$", and sometimes use "-or-self" variants with the obvious meaning. Specific index implementations will natively support these and other axes as well as further primitives (e. g. is-child, level), but the current algorithms rely only on is-before-pre/post. An example implementation is the simple PPPL labeling scheme. Here, Node is a 4-tuple storing the pre/post ranks, the parent's pre rank, and the level of the node. Additionally, the hierarchy table is indexed on the pre/post ranks using two simple lookup tables. With PPPL, the index primitives obviously boil down to very cheap $\mathcal{O}(1)$ arithmetics on Node, so this is as fast as a hierarchy index can get. If some degree of update support is needed, however, a more sophisticated indexing scheme must be chosen. Note again that, while one can rely on the NODE abstraction for ease of presentation, the concepts and algorithms herein can be adapted to any specific "hard-coded" encoding that affords the said primitives.

A hierarchical computation propagates and accumulates data—usually numeric values—along the hierarchy edges. Data flow can happen either in the direction towards the root (bottom up) or away from the root (top down, matching the natural direction of the edges). Unlike the "static" labels stored with the base table itself (e. g., ID and Weight in HT), the computation input is generally the result of an arbitrary subquery that associates some hierarchy nodes with input values, such as table Inp1 of FIG. 2A.

In an analytic scenario, HT may be a so-called dimension hierarchy arranging products (leaves) into products groups (inner nodes), and a fact table Sales may associate each sale item with a specific product, i.e., a leaf of HT:

Sales: {[Sale, Item, Customer, Product, Date, Amount]}

Here, the computation input would be the amounts from Sales, attached to some of the product leaves via join. A canonical task in such scenarios known as rollup is to sum up the revenue of certain products—say, "type A"—along the hierarchy bottom up and report these sums for certain product groups visible in the user interface—say, the three uppermost levels. The following SQL statement I-a computes the rollup, using the IS_DESCENDANT_OR_SELF and LEVEL constructs (as described in U.S. patent application Ser. No. 14/614,859):

```
                                                    I-a
    WITH Inp1 AS (
        SELECT p.Node, s.Amount AS Value
            FROM HT p JOIN Sales s ON p.Node = s.Product
            WHERE p.Type = 'type A' )
    SELECT t.*, SUM(u.Amount) AS Total
        FROM HT t LEFT OUTER JOIN Inp1 u
            ON IS_DESCENDANT_OR_SELF(u.Node,t.Node)
        WHERE LEVEL(t.Node) <= 3
        GROUP BY t.*
```

This represents a type of hierarchical computations with two particular characteristics: First, only a subset of nodes carry an input value—often only the leaves, as in the example; one can call these input nodes. Second, the set of input nodes is mostly disjunct from the output nodes that after the computation carry a result one can be interested in. Input and output nodes are therefore determined by separate subqueries and the queries follow a join-group-aggregate pattern. This scheme can be referred to as binary structural grouping. "Structural" here alludes to the role the hierarchy structure plays in forming groups of tuples. The query plans are typically variations of $\Gamma_{t,*;x;f}(e_1[t] \bowtie_{u<} e_2|u|)$. Here $\bowtie$ denotes the standard left outer join operation. $\Gamma$ denotes unary grouping, which in this case groups its input tuples by t.*, applies function $f$ to each group, and attaches an attribute x carrying the resulting aggregate value to each group. < reflects the input/output relationship among tuples. Suppose one wanted to compute a rollup based on the example input Inp1, and one is interested in three output nodes given by Out1 in FIG. 2A. To do so, one can use $e_1$=Out1, $e_2$=Inp1, and define the < predicate as H.is-descendant-or-self (u.Node, t.Node) and $f(X)$ as $\Sigma_{u \in X}$u.Value. This yields the sums 6310, 310, and 100 for A1, B1, and C1, respectively.

Such query plans perform acceptably when $f$ is cheap to compute and the set of output nodes is rather small. However, there is a major efficiency issue: for each $e_1$ tuple, the computation $f$ bluntly sums up all matching input values from $e_2$, while ideally one can reuse results from previously processed $e_1$ tuples. In the example, to compute the sum for A1 one can save some arithmetic operations by reusing the sum of B1 and adding just the input values of D1/D2/D3. With respect to <, one can say that the output node B1 is covered by the output node A1 and thus carries a reusable result. To enable such reuse, the binary grouping algorithms provided herein process the $e_1$ tuples in <-order and memorize any results that may be relevant for upcoming $e_1$ tuples. Thereby they overcome the mentioned inefficiencies.

From an expressiveness point of view, the widespread join-group-aggregate statements are fairly intuitive to most SQL users, yet not fully satisfactory: they lack conciseness, since conceptually a table of < pairs must be assembled by hand prior to grouping, and the fact that a top-down or bottom-up hierarchical computation is being done is somewhat disguised. They become tedious especially when the output and input nodes largely overlap or are even identical, as in

```
                                                    II-a
    SELECT t.Node, SUM(u.Value)
        FROM Inp1 AS t LEFT OUTER JOIN Inp1 AS u
            ON IS_DESCENDANT_OR_SELF(u.Node, t.Node)
        GROUP BY t.*
```

The proposed extensions to SQL's windowed table provided herein allow one to equivalently write:

```
                                                    II-b
    SELECT Node, SUM(Value) OVER (HIERARCHIZE BY Node)
        FROM Inp1
```

Figure 2:
FIG. 2 is a diagram illustrating (a) input/output nodes for binary grouping and (b) a combination of tables HT1 and Inp1 for unary grouping.

One can refer to this scheme as unary structural grouping, since the computation now works on a single table. It inherently yields a result for every tuple, i.e., every node acts as both an input and output node. A binary grouping query can usually be rewritten to unary grouping by working on the merged "$e_1 \cup e_2$" table and filtering the output nodes a posteriori. For example, Inp2 in FIG. 2b shows a combination of HT and Inp1; here NULL is assigned as a neutral value to nodes which do not carry a meaningful value. Rewriting binary to unary computations will often result in more concise and intuitive statements. Especially when there is no clear distinction between input and output nodes, unary grouping is the most natural approach.

The unary structural grouping mechanism offers another attractive language opportunity: support for structural recursion. Using a structurally recursive expression one can state the rollup in Stmt. II-a and II-b in yet another way:

```
                                                    II-c
    SELECT Node, RECURSIVE INT (Value + SUM(x) OVER w) AS x
        FROM Inp1 WINDOW w AS (HIERARCHIZE BY Node)
```

This expression for x sums up the readily computed sums x of all tuples that are covered by the current tuple. Unlike binary grouping, unary grouping with structural recursion makes the reuse of previous results explicit and thus inherently translates into the efficient evaluation approach. Furthermore, it enables one to state significantly more complex computations with remarkable conciseness. For example, one can now straightforwardly take the edge weights from Inp2 into account in the rollup:

```
                                                    III
    SELECT Node, RECURSIVE DOUBLE (
            Value + SUM(Weight * x) OVER w) AS x
        FROM Inp2 WINDOW w AS (HIERARCHIZE BY Node)
```

Rather than actually performing recursion, the current operators evaluate unary grouping in a bottom-up fashion, leveraging a <-sorted input table like their binary counterparts.

As described below, various computations can be expressed in SQL. Unlike binary grouping, unary structural grouping is a novel concept to SQL. Provided below are details regarding various new syntax and semantics of extensions for unary grouping.

Windowed tables are a convenient and powerful means for aggregations and statistical computations on a single table, which otherwise would require unwieldy correlated subqueries. Their implicitly self-joining nature makes them a natural fit for structural grouping. One can therefore extend this mechanism by hierarchical windows.

A standard window specification may comprise a window partition clause, a window ordering clause, and a window frame clause. Consider how one may annotate the Sales table from with per-customer sales totals running over time:

```
SELECT Customer, Date, SUM(Amount) OVER w
FROM Sales WINDOW w AS (
        PARTITION BY Customer ORDER BY Date
        RANGE BETWEEN UNBOUNDED PRECEDING
        AND CURRENT ROW EXCLUDE NO OTHERS )
```

The frame clause "RANGE . . . NO OTHERS" is the implicit default and could be omitted. Briefly put, the query is conceptually evaluated as follows: (1) the Sales are partitioned by Customer; (2) each partition is sorted by Date; (3) within each sorted partition, each tuple t is associated with a group of tuples relative to t, its window frame as determined by the frame clause, in this case: all sales up to t; (4) the window function (SUM) is evaluated for that group and its result appended to t. The frame is always a subsequence of the current ordered partition. Note that tuples need not be distinct with respect to the ORDER BY fields. Tuples in is frame that match in these fields are called peers or TIES.

For unary structural grouping, the windowed table will be some collection of nodes (e. g. Inp1); that is, there is a NODE field whose values are drawn from a hierarchical base table (e. g. HT). One can extend the standard window specification with a new HIERARCHIZE BY clause specifying a hierarchical window. This clause may take the place of the ordering clause behind the partitioning clause. That is, partitioning happens first as usual, and hierarchizing replaces ordering. While window ordering turns the partition into a partially ordered sequence, hierarchizing turns it into an directed acyclic graph derived from the hierarchy. One can begin the discussion with a minimal hierarchical window specification, which omits partitioning and the frame clause (so the above default applies):

HIERARCHIZE BY v [BOTTOMUP|TOP DOWN]

The clause determines the NODE field v, its underlying hierarchy index H, and the direction of the intended data flow (bottom up by default), giving one all information needed to define an appropriate < predicate on the partition:

top-down: $u<t:\Leftrightarrow H.\text{is-descendant}(t.v,u.v)$ bottom-up: $u<t:\Leftrightarrow H.\text{is-descendant}(u.v,t.v)$ The notion of covered elements used informally above is also needed. An element u is said to be covered by another element t if no third element lies between them:

$u<:t:\Leftrightarrow u<t \wedge \neg \forall u': u<u'<t.$  Eq. 1

Using <:, one can identify the immediate < neighbors (descendants/ancestors) of a tuple t within the current partition. Note that in case all hierarchy nodes are contained in the current partition, the "tuple u is covered by t" relationship is equivalent to "node u.v is a child/parent of t.v". However, the general <: notion is needed because the current partition may well contain only a subset of the nodes. The <: predicate helps one establish a data flow between tuples even when intermediate nodes are missing in the input.

A tuple u from the current partition can be related in four relevant ways to the current tuple t:

(a) $u<t$ (b) $t<u$ (c) $u.v=t.v$ (d) neither of those

To reuse the syntax of the standard window frame clause without any modifications, one may need to reinterpret three concepts accordingly: PRECEDING tuples are those of category (a); FOLLOWING tuples are those of category (b); TIES are tuples of category (c). In the bottom-up case, PRECEDING tuples correspond to descendants and FOLLOWING tuples to ancestors of t. v. These terms are not to be mixed up with the preceding and following hierarchy axes. Tuples on those axes, as well as tuples where v is NULL, fall into category (d) and are always excluded from the frame. The default frame clause includes categories (a), (c), and the current row itself. The handling of (c) tuples can be controlled independently via the EXCLUDE clause.

Consider FIG. 3, where one can apply a bottom-up hierarchical window to table Inp3 and compute x=SUM (Value) like in Stmt. II-b from above (and reproduced here:

II-b
```
SELECT Node, SUM(Value) OVER (HIERARCHIZE BY Node)
    FROM Inp1
).
```

The matrix indicates the relationships of the tuples. Since the current window uses the default frame clause, the frames comprise exactly the <, <:, and $\hat{=}$ tuples. Summing over them yields the x values shown to the right. Note that although Inp3 does not include the intermediate nodes B1/C3/C4, the input values of C1/C2 do still count into A1, and likewise for D1/D3 and the B2 tuple, as illustrated by the data flow graph to the right. As said, unary grouping does not require all intermediate nodes to be present in the input. In that, it behaves precisely like the alternative binary approach based on an IS_DESCENDANT_OR_SELF join (Stmt. II-a). For basic rollups, which are by far the most common type of hierarchical computation, the implicit window frame clause does exactly the "right thing"—thanks to the definitions of < and the PRECEDING/FOLLOWING concepts—and it is hard to imagine a more concise and readable way of expressing them in SQL.

Recursive Expressions.

Thus far, hierarchical windows are merely a shorthand; they can equivalently be expressed through join-group-aggregate statements. Structural recursion, however, significantly extends their expressive power. To enable recursive expressions, one can recycle the SQL keyword RECURSIVE and allow wrapping it around expressions containing one or more window functions:

RECURSIVE [τ](expr) AS c

This makes a field c of type τ accessible within any contained window function, and thus provides a way to refer to the computed expr value of any tuple in the window frame. If c is used anywhere in expr, τ must be specified explicitly, and an implicit CAST to τ is applied to expr. Automatic type deduction in certain cases is a possible future extension, but it is not generally possible without ambiguity. The following additional rules apply: First, if expr contains one or more window function expressions of the form "$expr_i$ OVER $w_i$", all used hierarchical windows $w_i$ must be equal (same partitioning and HIERARCHIZE clause, i.e., NODE field and direction). Second, the frame of each window $w_i$ is restricted as follows: only the covered tuples ("RANGE 1 PRECEDING") can potentially be included in the frame, and in particular EXCLUDE GROUP is enforced. That is, the frame clause of every window function within expr effectively becomes:

RANGE BETWEEN 1 PRECEDING AND CURRENT ROW EXCLUDE GROUP

This in particular ensures that the window frame will not contain the CURRENT ROW, any TIES, or any FOLLOWING tuples. If any of those were contained in the frame, any access to field c within expr would create a circular dependency. Third, the field c may appear only within one of the window function expressions $expr_i$; say, in combination with an aggregate function AGG:

$$\text{RECURSIVE } \tau( \ldots \text{AGG}(expr') \text{ OVER } w \ldots ) \text{ AS } c$$

Mentioning c outside a window function would implicitly access the current tuple, which is forbidden, whereas according to SQL's rules mentioning c within expr' implicitly accesses the frame row (FRAME_ROW), which thanks to the restrictive window frame can only be a covered tuple for which the c value is available. While this standard behavior is what is usually intended and quite convenient, SQL has a way to override the implicit frame row access. One could for example refer to the current tuple even within AGG by using a so-called nested window function:

$$\text{AGG}( \ldots \text{ VALUE\_OF}(c \text{ AT CURRENT\_ROW}) \ldots ) \text{ OVER } w$$

This is prohibited for c, but it is allowed any other field.

Returning to diagram 300 of FIG. 3, one can now equivalently apply the recursive rollup expression of Stmt. II-c, x=RECURSIVE INT (Value+SUM(x) OVER w) AS x, to Inp3. The window frames are now restricted to the covered <: tuples. Since Inp3 is already ordered suitably for bottom-up evaluation—i. e. postorder—one can fill in the x result column in a single pass and always have the x values of the frame rows at hand.

Even with non-recursive expressions, hierarchical windows are already an attractive alternative to verbose join-group-aggregate statements. Consider the opening query I-a from above (and reproduced below).

```
WITH Inp1 AS (                                                    I-a
   SELECT p.Node, s.Amount AS Value
      FROM HT p JOIN Sales s ON p.Node = s.Product
      WHERE p.Type = 'type A' )
SELECT t.*, SUM(u.Amount) AS Total
   FROM HT t LEFT OUTER JOIN Inp1 u
      ON IS_DESCENDANT_OR_SELF(u.Node,t.Node)
   WHERE LEVEL(t.Node) <= 3
   GROUP BY t.*
```

SQL allows aggregation to be restricted by a FILTER. This handy feature allows one to state this query as follows:

```
                                                                  I-b
SELECT * FROM (
   SELECT HT.*,
      SUM(Amount) FILTER (WHERE Type = 'type A') OVER w
      FROM HT LEFT OUTER JOIN Sales s ON Node = s.Product
      WINDOW w AS (HIERARCHIZE BY Node)
) WHERE LEVEL(Node) <= 3
```

This saves one join over Stmt. I-a. Note the outer join may yield tuples where Amount is NULL, but these are conveniently ignored by SUM. Altogether there are three points where one could add WHERE conditions: a priori (before windows are formed), as FILTER (restricting the computation input but not affecting the table), and a posteriori (restricting the output). For the latter one must nest two selections, as SQL currently has no HAVING equivalent for windowed tables.

FIG. 4 shows further meaningful expressions, including non-recursive variants where possible, each based on either a bottom-up or a top-down hierarchical window on Inp2:

```
                                                                  IV
SELECT Node, expr FROM Inp2
   WINDOW td AS (HIERARCHIZE BY Node TOP DOWN),
          bu AS (HIERARCHIZE BY Node BOTTOM UP)
```

(1) in FIG. 4 is the familiar rollup. Besides SUM, the operation in (1a) of FIG. 1 could e.g. be AVG, MIN, MAX, COUNT (cf. Ex. 7), EVERY, ANY, or ARRAY_AGG to simply collect all values in an array. SQL's DISTINCT and FILTER constructs add further expressiveness. E. g., in a bill of materials one may count the distinct types of subparts of a certain manufacturer that each part is built of:

```
COUNT(DISTINCT Type) FILTER(WHERE
   Manufacturer='A') OVER bu
```

(2) in FIG. 4 is a top-down counterpart to (1); it yields the effective weights by multiplying over all tuples on the root path. (2a) uses a hypothetical PRODUCT aggregation function, which is curiously missing from standard SQL; (2b) works around that via recursion, aptly taking advantage of FIRST_VALUE. To understand the example, note that for a top-down recursive computation, the window frame can be either empty—making FIRST_VALUE yield NULL—or contain one covered ancestor. In the bill of materials the weight could be the part's multiplicity ("how often?") within its super-part; here the product would tell that the part often appears in total in the assembly.

(3) is a variant of (1) summing over only the covered tuples. In (3b) one can access only Value but not the actual expression result (thus, its type τ can be auto-deduced); still, the semantics are those of recursive evaluation. As Inp2 happens to contain all HT nodes, the cover relation <: becomes equivalent to the IS_CHILD predicate as noted earlier; so the same could as well be achieved via join-group-aggregate.

(4) are variants of weighted rollup. (4d) is mostly equivalent to (4b), but brings it into a form similar to (4c) using a nested window function to access the Weight of the current row. In general, such weighted rollups cannot be performed without (structural) recursion. However, a non-recursive workaround that sometimes works is to "multiply out" the expression according to the distributivity law and use two separate computations: First (2a), yielding absolute weights w for each tuple, then SUM(w*Value) bottom up.

(5) constructs a path-based Dewey representation of the hierarchy using the same technique as (2): it builds a string from the ID values on the root path, e. g. '/A1/B1/C1' for C1.

(6-9) compute properties of the data flow graph over the input table.

As Inp2 contains all nodes of HT, they are equal to the node's (6) level, (7) subtree size, (8) subtree height, and (9) child count. In general (7) gives the size of the window frame and (9) the number of covered tuples.

Finally (10), if one needs to go beyond the capabilities of SQL's aggregate functions and expression language, one can use ARRAY_AGG to collect data from the covered tuples and pass it to a user-defined function. This way arbitrarily complex computations can be plugged in.

Structural Grouping Operators.

Provided herein are two logical operators for evaluating hierarchical computation queries, one for unary and one for binary structural grouping.

Binary Grouping.

Binary structural grouping queries typically feature an inner or left outer join on a hierarchy axis such as IS_DE-SCENDANT, and subsequent grouping of the outer side.

They are initially translated into plans of the form $\Gamma(\text{'}\bowtie_\theta\text{'})$ with a suitable hierarchy predicate $\theta$. Due to the efficiency issues noted above, the query optimizer to rewrite this pattern into a single combined operator.

The binary grouping operator $\bowtie$ consumes two input relations $\{\tau_1\}_b$ and $\{\iota_2\}_b$ given by expressions $e_1$ and $e_2$, where $\{\ \}_b$ denotes a bag and $\tau_1$ and $\tau_2$ are tuple types. Let $\theta$ be a join predicate, x a new attribute name, and $f$ a scalar aggregation function $\{\tau_2\}_b \to \mathcal{N}$ for some type $\mathcal{N}$. Then $\bowtie$ is defined as $$e_1 \bowtie_{x:f}^\theta e_2 := \{t \circ [x:f(e_2[_\theta t])] | t \in e_1\}_b,$$

where $e[_\theta t] := \{u | u \in e \wedge \theta(u,t)\}_b$. It extends each tuple $t \in e_1$ by an x attribute of $\mathcal{N}$, whose value is obtained by applying function $f$ to the bag $e[_\theta t]$, which contains the relevant input for tuples t.

As an example, the plan $\Gamma_{t,*;x;f}(\text{Out1}[t] \bowtie_{u<t} \text{Inp1}[u])$ from above can be rewritten into Out1 $\bowtie_{x:f}^< $ Inp1, using the same definitions of $f$ and $<$. Beyond optimizing $\Gamma(\text{'}\bowtie_\theta\text{'})$ plans, one can also use $\bowtie$ to evaluate hierarchical windows with non-RECURSIVE expressions. They are translated into binary self-grouping $e \bowtie_{x:f}^\theta e$, with $\theta$=is-descendant-or-self in the bottom-up and $\theta$=is-ancestor-or-self in the top-down case (modulo handling details of the frame clause and EXCLUDE). Further optimizations are possible from there. Consider Stmt. I-b, which has a condition H.level(v)≤3 on the output that does not depend on the computed sum x. Select operators $\sigma_\phi$ of this kind can typically be pushed down to the left input of $\bowtie$. The FILTER $\psi$ can be handled by $f$ or pushed down to the right input. Such rewriting from $\sigma_\phi(e \bowtie_{x:f_\psi}^\theta e)$ to $\sigma_\phi(e) \bowtie_{x:f}^\theta \sigma_\psi(e)$ will always pay off, especially when the selections can be pushed down even further.

Unary Structural Grouping.

To evaluate recursive expressions on a hierarchical window, a new operator is provided herein: unary structural grouping. Since the concept as such may be useful beyond hierarchical windows, one may define it in terms of an abstract $<$ comparison predicate on the tuples of its input relation, which drives the data flow. It is required to be a strict partial order: irreflexive, transitive, and asymmetric. The operator arranges its input in an directed acyclic graph whose edges are given by the notion of covered tuples $<$: (see Equation 1 above). On that structure it evaluates a structural aggregation function $f$ which performs an aggregation-like computation given a current tuple t and the corresponding bag of covered tuples. In other words, a variable, pseudo-recursive expression $f$ is evaluated on a recursion tree predetermined by $<$.

Let expression e produce a relation $\{\tau\}_b$ for some tuple type $\tau$; let $<$ be a comparator for $\tau$ elements providing a strict partial ordering of e's tuples, x a new attribute name, and $f$ a structural aggregation function $\tau \times \{\tau \circ [x: \mathcal{N}]\}_b \to \mathcal{N}$, for some scalar type $\mathcal{N}$. The unary structural grouping operator $\hat{\Gamma}$ associated with $<$, x, and $f$ is defined as $$\Gamma_{x:f}^<(e) := \{t \circ [x:\text{rec}_{x:f}^<(e,t)] | t \in e\}_b, \text{ where}$$

$$\Gamma\text{rec}_{x:f}^<(e) := f(t, \{u \circ [x:\text{rec}_{x:f}^<(e,u)] | u \in e[_{<:}t]\}_b),$$
where One can reuse the symbol r of common unary grouping for r. Both are similar in that they form groups of the input tuples, but r does not "fold away" the tuples. Instead, it extends each tuple t in e by a new attribute x and assigns it the result of "rec", which applies $f$ to t and the bag of its covered tuples u. The twist is that each tuple u in the bag already carries the x value, which has in turn been computed by applying rec to u, in a recursive fashion. Thus, while $f$ itself is not recursive, a structurally recursive computation is encapsulated in r's definition. The recursion is guaranteed to terminate, since $<$ is a strict partial order.

For hierarchical windows, one can define $<$ as above in terms of H.is-descendant, which is indeed irreflexive, transitive, and asymmetric. One can now translate the two statements II-c and III above into plans based on $\hat{\Gamma}$:

$$\hat{\Gamma}_{x:f}^<(\text{Inp1}), f(t,X) = t.\text{Value} + \Sigma_{u \in X} u.x \qquad \text{II-c}$$

$$\hat{\Gamma}_{x:f}^<(\text{Inp2}), f(t,X) = t.\text{Value} + \Sigma_{u \in X} u.\text{Weight} * u.x \qquad \text{III}$$

FIG. 5 shows definitions of $f$ corresponding to the SQL expressions of FIG. 4. As the examples attest, RECURSIVE expressions translate almost literally into suitable $f(t, X)$ formulas.

Urnary Versus Binary Grouping.

Theoretically, there are little restrictions on the function $f$ of $\hat{\Gamma}$ and $\bowtie$; the practical limit is what SQL's expression language allows one to write. It is, however, useful to distinguish a class of common "simple" functions that can establish a correspondence between $\hat{\Gamma}(e)$ and binary self-grouping $e \bowtie e$. An aggregation function $\{\tau\}_b \to \mathcal{N}$ for use with $\bowtie$ is simple if it is of the form $$acc_{\oplus;g}(X) := \bigoplus_{u:u \in X} g(u),$$

where function $g:\tau \to \mathcal{N}$ extracts or computes a value from each tuple, and $\oplus$ is a commutative, associative operator to combine the $\mathcal{N}$ values. This largely corresponds to what SQL allows for expressing in the form AGG(expr) where AGG is a basic aggregate function such as SUM, MIN, MAX, EVERY, or ANY without DISTINCT set quantifier. (A further extension to arbitrary FILTER(WHERE $\pi$) conditions is possible.)

One can define a structural counterpart as follows: A structural aggregation function $\tau \times \{\tau \circ [x: \mathcal{N}]\}_b \to \mathcal{N}$ for use with $\hat{\Gamma}$ is simple if it is of the form $$str\text{-}acc_{x:\oplus;g}(t, X) := g(t) \oplus \bigoplus_{u \in X} u.x.$$

In FIG. 5, functions 1b, 2b, 6b, and 7b are in fact simple.

To obtain the correspondence, consider $R := \hat{\Gamma}_{x:str\text{-}acc}^<(e)$. If the acyclic digraph imposed by $<$ on e is a tree—i. e., there are no undirected cycles—the following holds for all $t \in R$:

$$t.x = g(t) \oplus \bigoplus_{u \in R[<:t]} u.x = g(t) \oplus \bigoplus_{u \in e[<:t]} g(u) = \bigoplus_{u \in e[\leq:t]} g(u)$$

where $u \leq t :\Leftrightarrow u < t \vee y = t$. The simple form of the aggregation function allows one to "hide" the recursion through the $<$ predicate and obtain a closed form of the expression for t.x based on the original input e. One can thus state the following correspondence:

$$e \bowtie_{x:str\text{-}acc_{\oplus;g}}^\leq e = \hat{\Gamma}_{x:str\text{-}acc_{x:\oplus;g}}^<(e).$$

Note that this equivalence will not hold if there are multiple chains $u<: \ldots <: t$ connecting two tuples $u<t$ in the input e.

In this situation, $\hat{\Gamma}$ would indirectly count u multiple times into t's result, while ⋈ would not. This is due to the particular semantics of structural recursion, which simply propagates x values along the <: chains. When $\hat{\Gamma}$ is applied in the hierarchical window setting, the equivalence holds as <: is derived from the acyclic tree structure of H, if it is additionally made sure there are no duplicate v values in the current window partition. The correspondence is then useful in both directions and enables significant optimizations: As many typical non-recursive hierarchical window computations (and sometimes even join-group-aggregate queries) fit the form of acc, one can rewrite their initial translation e ⋈ e into $\hat{\Gamma}$(e). As assessed elsewhere herein, even when e is just a table scan, the current $\hat{\Gamma}$ algorithms outperform ⋈ due to their simpler logic (e need not be evaluated twice) and effective pipelining. Vice versa, if one can algebraically transform a given RECURSIVE expression into the form of str-acc, ⋈ is an alternative to $\hat{\Gamma}$. If a WHERE condition $\phi$ on the output or a FILTER condition $\psi$ is applied $\sigma_\phi(e)$ ⋈ $\sigma_\psi(e)$ will usually be superior to $\sigma_\phi(\hat{\Gamma}_{f_\psi}(e))$, as already noted above. Finally, the current manual rewrite of Stmt. I-a to I-b, where one join is saved, demonstrates an advanced optimization from $e_1$ ⋈ $e_2$ into $\Gamma$: By "merging" the two inputs into $e_{12}$, one could (without going into details) rewrite $e_1$ ⋈ $e_2$ to $e_{12}$ ⋈ $e_{12}$ and then $\Gamma(e_{12})$, which pays off if $e_{12}$ can be further simplified, e. g., when $e_1$ and $e_2$ were very similar in the first place.

Efficient algorithms for are ⋈$_{x:f}^\theta$ and $\hat{\Gamma}_{x:f}^<$ now described.

[⋈ −Γ] A general approach for ⋈ is to treat θ as an opaque join predicate with partial order properties, and stick to a generic sort-based join-group-aggregate technique: sort both inputs $e_1$ and $e_2$ according to θ, then use a sort-based left outer join $e_1$[t] ⋈$_\theta$$e_2$[u], and then sort-based unary grouping $\Gamma_{t,*;x:f}$ to compute the result. This requires a non-equi join operator that deals correctly with the fact that some tuples may be incomparable through θ, and retains the order of $e_1$. Since no further assumptions are made on $e_1$ and $e_2$, a basic nested loops join can be used, making the runtime complexity an unattractive $\mathcal{O}(|e_1| \cdot |e_2|)$. An index-based nested loops join could not be used since there generally is no index on the given inputs—only the hierarchical base table HT is indexed. This approach can be referred to by "⋈ −Γ". It is usually the only option when an encoding such as PPPL from above is hand-implemented in an RDBMS without further engine support.

[hierarchy-⋈ −Γ] When ⋈ and $\hat{\Gamma}$ are used for hierarchical computations and θ and < operate on NODE fields, the underlying hierarchy index H can and should be leveraged. A big improvement over ⋈ −Γ is to use a hierarchy merge join, a sort-based structural join operator with a time and space complexity of $\mathcal{O}(|e_1|+|e_2|+|e_1\mathcal{O}e_2|)$. A hierarchy merge join algorithm can be provided that consumes preorder inputs, joins on the descendant axis, and retains the order of either $e_1$ or $e_2$ in the output: It can be considered the state of the art and a natural baseline for the native $\hat{\Gamma}$ and ⋈ algorithms. Note that even though more sophisticated join techniques have been studied in the XML world, most are not applicable to the current setting which is working on arbitrary inputs rather than the base table HT.

[hierarchy-$\hat{\Gamma}$, hierarchy-⋈] While the mentioned approaches can keep implementation efforts low by reusing existing operators, they cannot evaluate the structural recursion of $\hat{\Gamma}$, and they suffer from the efficiency issues noted above: all < join pairs rather than just the <: pairs are materialized and processed during query evaluation, and results from covered tuples are not reused. Provided herein are four specialized operators: hierarchy-$\hat{\Gamma}$ and hierarchy-⋈, each in a top-down and a bottom-up variant. The top-down variants require the inputs to be sorted in preorder, the bottom-up variants in postorder; this order is retained in the output. Their pseudo code is presented in the following. For ease of presentation, concepts from relational algebra level are directly used: An abstract data type Aggregate represents a tuple bag X and supports self-explanatory operations clear( ), add(u), and merge(X'). During execution of $e_1$ hierarchy-⋈ $e_2$ or hierarchy-$\hat{\Gamma}(e_1)$, one can create one Aggregate instance X per tuple t∈$e_1$, assemble the appropriate input tuples in it and feed it into the aggregation function $f(X)$ or $f(t, X)$ to obtain t.x. In the actual query-specific implementation of an Aggregate and its operations, significant optimizations may be possible depending on $f$.

Unary Hierarchical Grouping.

Alg. 1 shows the two variants of hierarchy-$\hat{\Gamma}$.

---

Algorithm 1: hierarchy-$\hat{\Gamma}_{x;f}^y(e)$

Input: e : $\{\tau\}_b$, where τ has a v : Node$^H$ field;
    e ordered by v in post-/preorder (bottom up/top down)
Output: $\{\tau'\}_b$, where τ' := τ o [x : $\mathcal{N}$ ]; same order
1  S : Stack([v : Node$^H$, u : τ', X : Aggregate(τ')])
2  X : Aggregate(τ')
3  for i ∈ e
4    if S ≠ ( ) ∧ S.top( ).v = t.v
5      skip                  // reuse previous X
6    else
7      X.clear( )
8  (collect input)*
9    yield t' ← t o [x : f(t,X)]
10  S.push([t.v,t',X])
*(collect input) - bottom up:
11 while S ≠ ( ) ∧ ¬H.is-before-pre(S.top( ).v,t.v)
12   [•, u, $X_u$] ← S.pop( )
13   X.add(u)            // leverage $X_u$ if possible!
*(collect input) - top down:
14 while S ≠ ( ) ∧ H.is-before-post(S.top( ).v,t.v)
15   S.pop( )
16 if S ≠ ( )
17   for [v, u, $X_u$] ∈ upper part of S where v = S.top( ).v
18     X.add(u)          // leverage $X_u$ if possible!

---

In a single pass through the input e, they effectively issue the following call sequence for each tuple t: X.clear( ); X.add(u) for each u<:t; yield to[x:$f$(t, X)] where "yield" outputs a result tuple. The stack S (line 1) manages previously processed tuples u and their computation states, i. e., u.x and the corresponding aggregate X for potential reuse. For each t∈e(l. 3). The algorithm can first check whether t.v matches the previous node; in this case, the algorithm can reuse X as is. (This step can be omitted if v is known to be duplicate-free). Otherwise, the "collect input" block (l. 8) maintains S and collects the tuples X covered by t. The algorithm can then compute $f$(t, X), construct and yield an output tuple and put it on S together with X for later reuse.

Regarding "collect input", consider first the bottom-up case (postorder input): Previously processed tuples on S, if any, are postorder predecessors and as such on the descendant and preceding axes relative to t. v, in that order when viewed from the top of stack (whereas upcoming e tuples will be on the ancestor or following axes). Therefore, the covered tuples X required for t are conveniently placed on the upper part of S. The while loop (l. 11) collects and removes them, as they will no longer be needed. Any remaining S entries are preceding and irrelevant to t, but might be consumed later. In the top-down case (preorder input), S may, when viewed from the top, contain obsolete preceding tuples, then relevant covered ancestor tuples to add to X, then further non-immediate ancestors which may still be needed in a future iteration. The while loop (l. 14) first dismisses the preceding tuples. If there is an entry left on top of S(l. 16), it is a covered ancestor u: t, and the for loop (l. 17) collects it and further tuples below with equal v (if not distinct in e). Due to the tree-structured data flow, there cannot be any further covered tuples. Unlike in the bottom-up case, the algorithm cannot pop the covered entries, since they may still be needed for upcoming following tuples (e. g., a sibling of v).

Note that explicit checks are not needed for <: in this algorithm—the covered tuples are identified implicitly. Note also that in l. 13 and 18, the full $X_u$ state corresponding to u.x is available to the add( ) operation. This state may be needed for non-trivial computations where u.x alone does not provide enough information. In case it is not needed, one need not keep X on S at all. Likewise, one may include on S only the fields of u that are actually accessed by $f$ to minimize memory consumption.

---

Binary Hierarchical Grouping. Alg. 2 shows hierarchy-$\bowtie$
Algorithm 2: $e_1$ hierarchy-$\bowtie_{x;f^{v_1;v_2}} e_2$ Input: $e_1 : \{\tau_1\}_b$ and $e_2 : \{\tau_2\}_b$, where $\tau_i$ has a $v_i$ : Node$^H$ field
$e_i$ ordered by $v_i$ in post-/preorder (bottom up/top down)

Output: $\{\tau_1 \circ [x : \mathcal{N}\;]\}_b$, same order as $e_1$
1  p : int, initially p ← 0 // position in $e_2$ (iterator)
2  $S_1$ : Stack ([v : Node$^H$, X : Aggregate($\tau_2$), 4 : int])
3  $S_2$ : Stack ($\tau_2$)
4  X : Aggregate($\tau_2$)
5  for $t_1 \in e_1$
6    if $S_1 \neq ($ $) \wedge S_1$.top( ),v = $t_1$.$v_1$
7      [•,X,•] ← $S_1$.top( )
8      yield $i_1 \circ$ [x : f(X)]
9      continue
10   X.clear( )
11   (collect input)*
12   yield $t_1 \circ$ [x : f(X)]
13   $S_1$.push([$t_1$,$v_1$, X , [$S_2$|])
*(collect input) - bottom up:
14  while $S_1 \neq ($ $) \wedge \neg$H.is-before-pre($S_1$.top( ).v,$t_1$.$v_1$)
15    [•,X',•] ← $S_1$.pop( )
16    X.merge(X')
17  while $S_2 \neq ($ $)
18    $t_2$ ← $S_2$.top( )
19    if $\neg(t_1$.$v_1$ = $t_2$.$v_2$ $\vee$ H.is-before-pre($t_1$.$v_2$,$v_2$))
20      break
21    $S_2$.pop( )
22    X.add($t_2$)
23  while p ≠ $e_2$.size( )
24    $t_2$ ← $e_2$[p]
25    if H.is-before-post($t_1$.$v_1$,$t_2$.$v_2$)
26      break
27    if $t_1$.$v_1$ = $t_2$.$v_2$ $\vee$ H.is-before-pre($t_1$.$v_1$,$t_2$.$v_2$)
28      X.add($t_2$)
29    else
30      $S_2$.push($t_2$)
31    p ← p + 1
*(collect input) - top down:
32  while $S_1 \neq ($ $) \wedge$ H.is-before-post($S_1$.top( ).v,$t_1$.$v_1$)
33    $S_1$.pop( )
34  j ← 0
35  if $S_1 \neq ($ $)
36    [•,X',j] ← $S_1$.top( )
37    X.merge(X')
38  while j ≠ $S_2$.size( ) $\wedge$ H.is-before-post($t_1$.$v_1$, $S_2$[j].$v_2$)

---

Binary Hierarchical Grouping. Alg. 2 shows hierarchy-$\bowtie$
Algorithm 2: $e_1$ hierarchy-$\bowtie_{x;f^{v_1;v_2}} e_2$ 39    X.add($S_2$[j])
40    j ← j + 1
41  pop $S_2$[j],...,$S_2$.top( )
42  while p ≠ $e_2$.size( )
43    $t_2$ ← $e_2$[p]
44    if H.is-before-pre($t_1$.$v_1$, $t_2$.$v_2$)
45      break
46    if $t_1$.$v_1$ = $t_2$.$v_2$ $\vee$ H.is-before-post($t_1$.$v_1$, $t_2$.$v_2$)
47      X.add($t_2$)
48    $S_2$.push($t_2$)
49    p ← p + 1

---

The bottom-up variant (postorder inputs) joins on θ=is-descendant-or-self, the top-down variant (preorder inputs) on θ=is-ancestor-or-self, with left outer join semantics. Other axes (child/parent and the non-"self" variants) as well as inner joins could be handled with minor adaptions. Both inputs are sequentially accessed: The outer loop (l. 5) passes through $e_1$, whereas $e_2$ is accessed via an iterator p. $S_2$ stashes processed $e_2$ tuples that may still become relevant as join partners. $S_1$ collects processed nodes $v_1$ from $e_1$ with the corresponding aggregates X of θ-matched $e_2$ tuples for reuse. i refers to an $S_2$ position and is needed in the top-down case.

For each $t_1 \in e_1$ (1.5) one can again either reuse X from a previous equal node (l. 6-9) or assemble X via "collect input", before producing an output tuple and memoizing X on $S_1$.

In the bottom-up case (postorder inputs), "collect input" first (l. 14) removes all covered descendant entries from $S_1$ and merges their aggregates into X. This operation is the key to effectively reusing partial results as motivated above. The following loop (l. 17) moves relevant θ matches on the descendant-or-self axis from $S_2$ to X, and the final loop (l. 23) advances the right input $e_2$ up to the first postorder successor of $v_1$. Any encountered $t_2$ is either a postorder predecessor or $v_2=v_1$; if $t_2$ is also a preorder successor, it is a descendant. θ matches are added straight to X(l. 28), preceding tuples are stashed on $S_2$ (l. 30).

The top-down case (preorder inputs) is more involved: $S_1$ and $S_2$ entries may be consumed multiple times and therefore cannot be immediately popped from the stacks. $S_1$ and $S_2$ are maintained in such way that they comprise the full chain of ancestor tuples from $e_1$ and $e_2$ relative to $v_1$. Field i on $S_1$ establishes the relationship to $S_2$: For an $S_1$ entry [v, X, i], the bag X incorporates all θ matches for v, corresponding to the $S_2$ range [0, i[ (i. e., from the bottom to position i, exclusively). If there is another $S_1$ entry [v', X', i'] below, then v' is the covered ancestor of v, and X consists exactly of X' plus the $S_2$ tuples at positions [i',i[. Maintaining these invariants requires four steps: First (l. 32), one can pop obsolete preceding entries from $S_1$. Second (l. 35), any remaining entry on $S_1$ is an ancestor, so one can reuse its X'. Third (l. 38), one can add to X any additional ancestors $t_2$ that were not already in X' (starting from position j). Then, the remaining $S_2$ tuples from positions j to top are preceding and therefore obsolete (l. 41). Finally (l. 42), one can advance $e_2$ up to the first preorder successor of $v_1$, adding ancestor-or-self tuples to X and $S_2$ but ignoring preceding tuples.

Recall from above that hierarchy-$\hat{\Gamma}$ is used for RECURSIVE expressions on hierarchical windows and hierarchy-$\bowtie$ for non-recursive expressions (through self-grouping e ⋈ e) as well as certain classes of join-group-aggregate statements. Handling the details of hierarchical windows—i. e., different variants of frame and EXCLUDE clauses—requires further additions to Alg. 1 and 2; in particular, tuples with equal v values must be identified and handled as a group.

Inline Computations.

The following optimization is crucial to the practical performance of ⋈ and $\hat{\Gamma}$: while the pseudo code of Alg. 1 and 2 explicitly collects tuples into some bag X, one can often avoid this buffering altogether by evaluating $f$ on the fly. To this end the query compiler has to generate specific code in place for the Aggregate operations:

① $X$.clear( ),② $X$.add($u$),③ $X$.merge($X'$),④ $f(t, X)$.

Consider Expr. 1b from FIG. 5: The actual state of X would be a partial sum x: $\mathcal{N}$, and the operations boil down to ① $x \leftarrow 0$, ② $x \leftarrow x+u.x$, ③ $x \leftarrow x+X'.x$, and ④ $x+t.x$.

This works with both $\hat{\Gamma}$ and ⋈.

As a structurally recursive example with $\hat{\Gamma}$, consider the Expr. 4c: here the state remains the same but ② becomes $x \leftarrow x+u.\text{Weight}*u.x$.

Eliminating X like this works whenever either the scalar x value itself or some other data of $\mathcal{O}(1)$-bounded size can adequately represent the required information of a sub-computation. This roughly corresponds to the classes of distributive (e. g. COUNT, MIN, MAX, and SUM) and algebraic aggregation functions (e. g. AVG, standard deviation, and "k largest/smallest"). But then there are SQL expressions, such as ARRAY_AGG or DISTINCT aggregates, for which one can have to actually maintain X or some state of size $\Theta(|X|)$. Consider COUNT(DISTINCT Weight): To evaluate this using either $\hat{\Gamma}$ or ⋈, the Aggregate has to maintain a set of distinct Weight values. Still, the current mechanism for reusing sub-computations provides certain optimization opportunities; e. g., using an efficient set union algorithm for operation ③.

Complexities.

With this in mind, consider the runtime and space complexities. One can assume the is-before primitives to be in $\mathcal{O}(1)$ for most static indexes and in $\mathcal{O}(\log |HT|)$ for common dynamic indexes, |HT| being the hierarchy size; either way, they are not affected by the input sizes of $\hat{\Gamma}$ and ⋈. Furthermore, if the computation is done inline as discussed, |X| and all operations on X are actually in $\mathcal{O}(1)$. Under this assumption, the time and space complexity is $\mathcal{O}(|e|)$ for hierarchy-$\hat{\Gamma}$ and $\mathcal{O}(|e_1|+|e_2|)$ for hierarchy-⋈. If the computation can not be inlined, one can fall back to actually collecting the respective input tuples in the X bags; this means the current algorithms degenerate to plain hierarchy merge join algorithms and their time and space complexities become $\mathcal{O}(|e_1|+|e_2|+|e_1 ⋈ e_2|)$. To obtain these results, an amortized analysis is needed to argue that the inner loops of the algorithms do not contribute to the overall complexity: Regarding hierarchy-$\hat{\Gamma}$, observe that the outer for loop pushes each e tuple once onto S (so |S|≤|e|), whereas the inner while loops remove one S entry per iteration; their bodies can thus be amortized to the respective pushes. Regarding hierarchy-⋈, the loop bodies of l. 23 and l. 42 are executed $|e_2|$ times in total, regardless of the outer loop; at most $|e_1|$ and $|e_2|$ tuples are pushed onto $S_1$ and $S_2$, respectively; and since the other loops pop either an $S_1$ or $S_2$ entry within each iteration, a similar argument applies.

Evaluation.

The algorithms above by design fit into an execution model which features a push-based physical algebra—by simply leaving out the outer for loops. Modern engines such are able to translate these algebra expressions into efficient machine code with no visible operator boundaries within pipelines; thus, there is minimal friction loss through the algebra, and one has effective pipelining.

For the hierarchy table HT, the schema from FIG. 1 was used, where each tuple has a unique CHAR(8) ID and a TINYINT Weight randomly drawn from the small domain [1,100]. The table size |HT| was varied from $10^3$ to $10^6$ to also cover loads that by far exceed L3 cache capacity: at $10^6$, HT and its index use ≈218 MB. For the hierarchy index one can compare two alternatives: [static] refers to the simple PPPL labeling scheme from above, which does not support updates but is extremely fast and thus attractive for read-mostly analytic scenarios. [dynamic] refers to the BO-tree indexing scheme, where each Node is linked to two entries in a dynamic B+-tree structure. The suggested configuration with mixed block sizes and gap back-links was used. It is a good fit for dynamic OLTP scenarios, although the support for updates comes at a cost of computationally non-trivial $\mathcal{O}(\log |HT|)$ query primitives and increased memory traffic. Other dynamic indexing schemes will of course show different characteristics; still, comparing dynamic vs. static gives one a good hint of the overhead to expect from accessing an external, dynamic index structure. All experiments use a generated forest structure Regular $\langle k \rangle$ where each tree is given m=$10^4$ nodes and each inner node exactly k children. This way increasing |HT| does not affect the total height h. To assess the influence of the hierarchy shape, very deep (k=2, h≈13.2) trees to very shallow (k=32, h≈3.6) trees were compared.

Hierarchical Windows.

To assess the bare performance of hierarchical windows, Stmt. IV can be run with various expressions from diagram 400 of FIG. 4 on a pre-materialized table Inp. Queries Q1 and Q2 compute Expr. 1a bottom up and top down, respectively and represent non-recursive computations. Q3 computes Expr. (4c) and represents a structurally recursive computation. Q4 computes COUNT(DISTINCT Weight) bottom up and features a comparatively expensive duplicate elimination. For each query one can measure alternative plans. All plans work on the same input Inp, which is prepared a priori as follows: One can select the contents of HT (thus, |Inp|=|HT|), add a randomly populated INT Value field, project the required fields and sort the data in either preorder or postorder as needed by the respective plan. The measurements thus show the bare performance of the respective operators without any pre- or post-processing—in particular, without sorting—but including materialization of the query result. One can compare the following plans, where applicable: (a) the straight translation into hierarchy-$\hat{\Gamma}$ (Inp); (b) the alternative hierarchy-⋈ (Inp, Inp), to assess the overhead over hierarchy-$\hat{\Gamma}$; (c) the hierarchy-⋈-$\Gamma$ approach above with a preorder-based hierarchy merge join; (d) the ⋈-$\Gamma$ approach with a nested loops join. As explained above, (c) is a natural baseline, whereas (d) will often be the only option with hand-implemented encodings. One can furthermore consider two plans based on a semi-naive least-fixpoint operator, which mimic SQL's recursive CTEs: (e) iterative uses repeated IS_CHILD hierarchy merge joins to first compute all < pairs bottom up (Q1) or top down (Q2) and then performs the actual computation using sort-based grouping. (f) iterative* additionally applies sort-based "early grouping" within each iteration. This gives one a hint of the performance to expect from an exceptionally well-optimized RCTE or from a hand-crafted iterative stored procedure. One can commonly see such procedures in real-world applications that still rely on trivial parent/child tables (known as adjacency list model). However, (e) and (f) are no general solutions; they work in the setup only because all HT nodes are present in Inp. Note also that plans (b)(f) work only for non-recursive computations.

FIG. 6 is a diagram 600 that shows the results, normalized with respect to the processed elements |Inp|. The red line indicates the speed of tuple-by-tuple copying a precomputed result table as the physical upper bound (≈37.6M/s). In Q1-3 with static, $\hat{\Gamma}$ is remarkably close to this bound (≈25.4M/s, or 67%). That non-recursive computations (Q1) using are not slower than recursive ones (Q3) comes at no surprise since the algorithm is identical. For both $\hat{\Gamma}$ and ⋈, the top-down algorithms (Q2) are slightly slower than the bottom-up algorithms (Q1), as they cannot dismiss covered tuples as early and thus inherently issue more index calls. The duplicate elimination of Q4 is costly—both $\hat{\Gamma}$⋈ and become roughly 3× to 4× slower over the trivial arithmetics of Q1-3. When comparing e⋈e to $\hat{\Gamma}(e)$ over all queries Q1-4, one can see the latter is on average around 32% faster. The overhead of binary grouping stems from evaluating e twice (which in this case is a table scan) and from the extra index calls needed to associate $e_1$ and $e_2$ tuples. hierarchy-⋈-$\Gamma$ is significantly slower than ⋈, mostly in bottom-up Q1 (e. g. ≈11× slower at k=2) but also in top-down Q2 (≈3.5× at k=2); the gap grows with the hierarchy height. This confirms the known "groupjoin advantage" also for the hierarchical case—in line with the reports on hash-based equi-groupjoins. hierarchy-⋈-$\Gamma$ is somewhat handicapped at Q1, as the hierarchy merge join algorithm that can be used is preorder-based; as preorder is more natural to top-down computations, hierarchy-⋈-$\Gamma$ performs noticeably better at Q2. Interestingly, hierarchy-⋈-$\Gamma$ is not slowed down as much at Q4 vs. Q1 as the others; apparently, the intermediate join dominates the costs so that the subsequent processing-friendly sort-based grouping does not matter much. Correspondingly, the overhead over ⋈ is smaller at Q4, though still noticeable.

The iterative solutions are generally slow. Early aggregation helps much in the bottom-up case, where iterative* even approaches hierarchy-⋈ at |HT|=$10^6$. In the top-down case, however, early aggregation does not help reduce the intermediate result sizes, as IS_PARENT is an N:1 join; here, the (minor) savings over iterative come from saved arithmetic operations by reusing results of previous iterations.

Regarding dynamic versus static indexes, the more complex axis checks of the former are clearly noticeable: especially in top-down Q2, where inherently more axis checks are issued. Note the BO-tree is freshly bulkloaded; in practice the performance of most dynamic indexes tends to further degrade from incremental updates.

If one considers the hierarchy shape—deep k=2 versus flat k=32—one can see that iterative and iterative* are very sensitive—unsurprisingly, as their time complexity is proportional to h—whereas $\hat{\Gamma}$ and ⋈ are practically indifferent. The intermediate join result of hierarchy-⋈-$\Gamma$ is somewhat proportional to h, so it is also affected to some extent (factor 2-3).

Increasing the hierarchy size |HT| should slow down dynamic due to the $\mathcal{O}$(log |HT|) complexity of the index primitives. However, for the chosen block-based BO-tree index this apparently does not matter much in practice: the figures are practically indifferent to |HT|. One reason for this is the favourable data locality in the ordered inputs: the nodes involved in is-before checks are usually close in terms of pre/post distance, therefore the relevant BO-tree blocks will be in cache. hierarchy-⋈-$\Gamma$ and iterative are much more sensitive to |HT| due to their growing intermediate results.

Note that the above experiments assess only $e_1$ ⋈ $e_2$ where $e_1$=$e_2$, i.e., a unary hierarchical window setup. One can also conducted measurements where $e_1 \neq e_2$ with varying |$e_1$| and |$e_2$| sizes. However, the result was found to be completely in line with the complexity $\mathcal{O}$ (|$e_1$|+|$e_2$|+|$e_1$ ⋈ $e_2$|) of ⋈.

Sorting.

Being order-based, hierarchy-$\hat{\Gamma}$ and hierarchy-⋈ require pre- or post-ordered inputs. It is up to the cost-based optimizer to provide them by employing (a) explicit Sort operations via is-before; (b) ordered hierarchy index scans on the base table HT to establish the order in the first place; (c) order-preserving operators such as hierarchy merge join and the $\hat{\Gamma}$/⋈ to retain the order once established Consider running Expr. 2b from FIG. 4 directly on HT. In the bottom-up case, one can compare $e_1$=$\hat{\Gamma}(HT_{post})$ on an already post-ordered copy of HT, just like in Q1; $e_2$=$\hat{\Gamma}$(Sort$_{post}$(HT)), a full sort; $e_3$=$\hat{\Gamma}$(IndexScan$_{post}$(HT)), which accesses HT through a hierarchy index scan; and $e_4$=$\hat{\Gamma}$(Rearrange$_{post}$(HT$_{pre}$)); mutatis mutandis in the top-down case. The Rearrange operator consumes an already pre-ordered HT copy and employs a stack-based structural sorting algorithm similar to $\hat{\Gamma}$; its advantage is that it allows limited pipelining.

From the results in diagram 600 of FIG. 6, one can observe that full sorting is less expensive than one may expect (roughly 3× slower with static), considering that the algorithm is not multithreaded. Leveraging an index scan also helps much. But most interestingly, the "order-based sorting" of Rearrange is greatly superior to a full Sort, especially in the bottom-up static case: Rearrange closely approaches the "perfect" speed of $e_0$! This is again explained by pipelining effects and the favorable data locality in the already preordered inputs. This means the bottom-up algorithms are not restricted to postorder; they could be applied to preorder inputs as well at only moderate extra costs. To a slightly lesser extent this also applies to the preorder-based top-down algorithms.

Report Query.

Having assessed hierarchical windows in isolation, one can next look at a complete query, Q7. To emulate the setting of Stmt. I-a from above, one can use |HT|=$10_4$ and k=8, and prepare a table Inp with only a subset of the hierarchy HT, namely p % of its 8751 leaf nodes (randomly chosen). At the heart, Q5 performs a bottom-up rollup as Q1, but additionally (a) needs a join/union with the relevant output nodes of HT, (b) computes the contribution in % of each node's X value to the parent's total, (c) carries 128 bytes of further payload through the computation, (d) outputs only the 3 upper levels (584 nodes), ordered in preorder, and visualizes the nodes' positions to the user by Dewey-style path strings.

Such additional "stress factors" are commonly found in real-world queries. An example result line may be ['/A1/B1/C2', 125, 10%, payload], if the X value of '/A1/B1' is 1250. In SQL:

```
WITH T1 (Node, ID, Payload, X) AS (
  SELECT HT.Node, HT.ID, HT.Payload,
      SUM(Inp.Value) OVER (HIERARCHIZE BY HT.Node)
    FROM HT LEFT OUTER JOIN Inp ON HT.Node = Inp.Node ),
T2 (Node, ID, Payload, X, Contrib, Path) AS (
  SELCT Node, ID, Payload, X,
      RECURSIVE ( 100.0 * X / FIRST_VALUE(X) OVER w ),
      RECURSIVE VARCHAR(255) (
        COALESCE(FIRST_VALUE(P) OVER w, '') || '/' || ID)
      AS P,
    FROM T1 WINDOW w AS (HIERARCHIZE BY Node TOP
      DOWN) )
SELCET Path, X, Contrib, Payload FROM T2
  WHERE LEVEL(Node) <= 3 -- φ
  ORDER BY PRE_RANK(Node)
```

One can measure the following hand-optimized plans:

a. $\hat{\Gamma}(\text{Rearrange}_{pre}(\sigma_\phi(\hat{\Gamma}_X(\text{Sort}_{post}\ HT_\phi) \cup \text{Sort}_{post}(\text{Inp}))))$
b. $\Gamma(\text{Rearrange}_{pre}(\text{Sort}_{post}(HT_\phi) \bowtie_X \text{Sort}_{post}(\text{Inp})))$
c. $\text{Map}(\bowtie(\hat{\Gamma}_X(\text{Sort}_{pre}(HT_\phi) \bowtie \text{Sort}_{pre}(\text{Inp}))))$
d. $\text{Sort}(\text{Map}(\bowtie(\Gamma_X HT_\phi \bowtie \text{Inp})))$
e. $\text{Iterative}_\phi(HT,\text{Inp})$ In all plans, $\sigma_\phi$ has been pushed down and is handled by an ordered index scan of HT. Plans a and b use the $\hat{\Gamma}$ and $\bowtie$ operators. The outer $\hat{\Gamma}$ handles both top-down computations and preserves the desired preorder. For Plan c one can assume the hierarchical table model without the enhancements: It relies only on hierarchy merge joins, i. e., the hierarchy-$\bowtie$-$\Gamma$ approach. Lacking the syntax extensions, a lot of manual "SQL labour" is involved: The upper 3 levels must be joined via two IS_PARENT joins and the path strings built by hand (the two outer $\bowtie$ and Map operators in c/d). For Plan d one can assume a hand-implemented static PPPL-like labeling scheme. Lacking engine support, it can use only nested loops joins, i. e., the $\bowtie$-$\Gamma$ approach. For Plan e, one can assume again the adjacency list model and a hand-written stored procedure which does an iterative fixpoint computation (like iterative in Q1/Q2). Although Plans de are severely handicapped versus a-c, they are representative of the state of the art in real-world applications.

FIG. 6 shows the measured query throughput over varying p. The biggest pain point in this query is the expensive sorting of Inp, which could be alleviated through parallel sorting. Nevertheless, one can still see the merits of the proposed syntax and algorithms: Both $\hat{\Gamma}$ and $\bowtie$ reasonably handle the query, but the latter more naturally fits its binary nature. Their advantage over plain hierarchy-$\bowtie$-$\Gamma$ (c) is still visible, but less pronounced due to the damping effect of the sorting. It is not surprising that Plans c, d, and e, besides being unwieldy hand-crafted solutions, cannot hold up in terms of expressiveness and efficiency. Q7 is just one example query typically found in the application scenarios.

Expressing Hierarchical Computations.

While some query languages such as MDX or XML/XQuery offer native support for hierarchical data and certain computations, the goal is to remain in the world of SQL. Prior to the hierarchical tables, a uniform data model and language for handling hierarchies in RDBMS was lacking.

Earlier solutions are therefore usually hard-wired to particular relational encodings, which largely dictate the computations that can be expressed: On the low end is the trivial adjacency list model based on foreign key references to parent nodes, where recursion (see below) is required even for simple tasks. More sophisticated path- or containment-based encodings alleviate many tasks by allowing one to replace recursion by hierarchy joins, but computations are then limited to what join-group-aggregate statements can do. Another common "scheme" is the leveled model, where a denormalized table encodes a hierarchy with a fixed number of homogenous levels. Targeting this model in particular, SQL has a ROLLUP construct for simple sums, counts, and the like, but this is merely syntactic sugar for GROUPING SETS and again of limited expressiveness. The hierarchical table model relieves the user from dealing with the complexities and limitations of a hand-implemented encoding. Its abstract nature ensures that the provided constructs work with a multitude of indexing schemes on the query/update performance spectrum. Moreover, its main concept of a NODE field encapsulating the hierarchy provides attractive syntax opportunities which was explored above.

Recursion in SQL.

The only two common RDBMS-level mechanisms for working with recursively structured data are RCTEs and (iterative or recursive) stored procedures. These mechanisms afford generative recursion and are thus more powerful than the structural recursion of the RECURSIVE expressions. But their power and generality also makes them difficult to handle and optimize. With the optimization of linearly recursive CTEs with GROUP BY, directed graphs can be considered, whereas the focus is specifically on tree structures. Unsurprisingly, the specialized algorithms easily outperform techniques for RCTEs. Also, the simple nature of structural recursion—where the recursion tree is predetermined—leaves more room for optimizations, as provided above. Aside from performance, one may ask whether RCTEs are at least "sufficient" in terms of expressiveness, i. e.: Can RCTE-based recursion with GROUP BY emulate structural grouping? Alas, all the attempts to phrase such a computation in an iterative way—starting at the $\prec$-minimal tuples, then sweeping breadth-first over the input via $\prec$:—led to very convoluted EXISTS subqueries. Also, GROUP BY is forbidden in an RCTE definition to enable the semi-naive fix-point evaluation. Even if GROUP BY could be used, it would not necessarily capture all relevant covered nodes within each iteration. Thus, for the use cases, the computational power of RCTEs is only of theoretical relevance.

Evaluating Aggregation Queries.

Evaluating GROUP BY can be done using either sort-based or hash-based methods. Like sort-based grouping, the operators require ordered inputs and are order-preserving. Group-join improves join-group-aggregate plans by fusing $\bowtie$ and $\Gamma$. Consider the non-equi case, which is more comparable to the hierarchy-$\bowtie$ setting. Regarding ROLLUP, one approach can use a dedicated single-pass operator that reuses results of lower levels. It will be appreciated that techniques for standard windowed tables cannot easily be adapted to the hierarchical windows due to their unique semantics.

Hierarchy-Aware Operators.

Since XML data is inherently hierarchical and often stored in relational tables, there is a significant body of work on querying native XML stores or XML-enhanced RDBMS. Structural join operators resembling self-merge-joins leverage an available (though hard-wired) hierarchy encoding and maintain a stack of relevant intermediate results. Not all techniques from the XML world fit into the setting, however: Some of the more sophisticated join operators were designed to work directly on an indexed XML document. This enables advanced optimizations such as skipping. In contrast, the current operators are usually applied to arbitrary input tables with a NODE field (e. g., Inp1) rather than the hierarchical table (e. g., HT) itself. As indexing Inp1 on the fly seems infeasible; only HT's index was relied on, which renders many of the optimizations inapplicable. While one could e. g. adapt Staircase Join for cases where the computation runs directly on HT, this would benefit only a limited number of queries. Beyond binary structural joins, powerful tree pattern matching operators (e. g., twig joins) were proposed in the XML context; but these are beyond the requirements for handling hierarchical data in RDBMS.

Expressing hierarchical computations in RDBMS has always been severely impeded by data model and language issues, and even when possible, convoluted RCTEs or procedure calls rendered an efficient evaluation very difficult. One can resolve this situation by exploiting the opportunities of the hierarchical table model in terms of expressiveness and engine support. The NODE type and SQL's windowed tables turn out to be a natural fit. Together with structural recursion, a useful class of computations can be expressed concisely and intuitively. For their evaluation an order-based, index-assisted structural grouping operators is proposed. They rely entirely on pre- and post-order primitives and thus work with a multitude of indexing schemes. The current experiments confirm their merits over conventional approaches, which result from their robust linear space and time complexities and their computational power. Altogether the novel functionality provided herein greatly simplifies and speeds up the many applications that deal with hierarchies, in business software and beyond, by allowing them to push even more logic down to the RDBMS layer.

Figure 7:
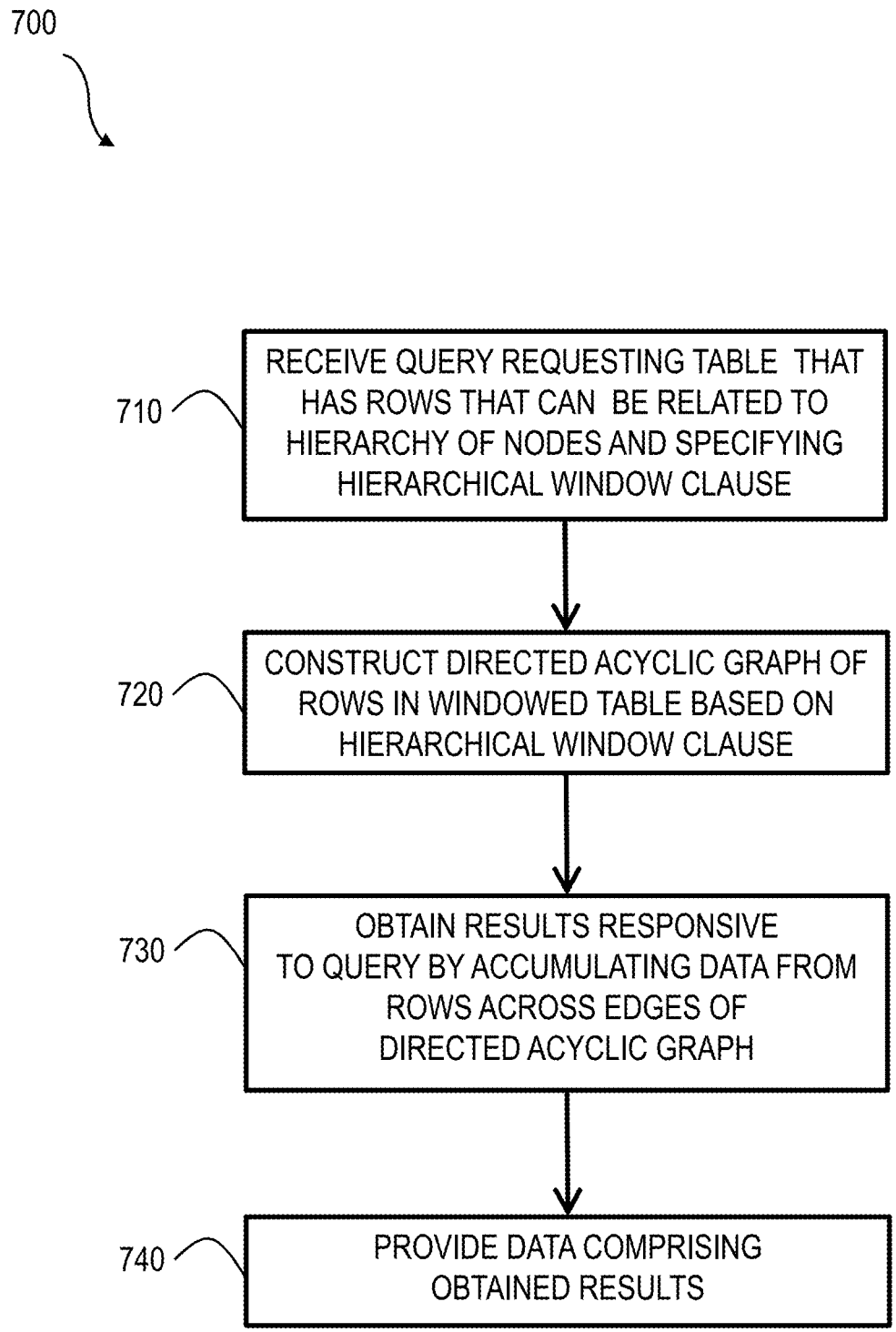
FIG. 7 is a process flow diagram illustrating execution of a database query on hierarchical data.

FIG. 7 is a process flow diagram 700 in which, at 710, a database receives a query. Part of the query is a request for a data table where each row is associated to a node (at most one) in a hierarchy of nodes, and a hierarchical window clause on that table. Thereafter, at 720, a directed acyclic graph of at least a portion of the rows in the windowed table generated (either conceptually or materialized in memory) based on the hierarchical window clause. Using the directed acyclic graph, at 730, results responsive to the query are obtained, by accumulating data from the rows across the edges of the graph, based on expressions specified in the query. Data comprising at least a portion of the obtained results are, at 730, then provided. Provided, in this context, can include one or more of: storing at least a portion of the obtained results in tangible data storage, loading at least a portion of the obtained results in memory, displaying at least a portion of the obtained results on an electronic visual display, and/or transmitting at least a portion of the obtained results to a remote computing system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:
    receiving, by a database, a query requesting data in the form of a single table in which each row of the single table is related to a different node of a hierarchy of nodes, the query providing for unary structural grouping with structural recursion in which each node acts as an input node and an output node, the received query encapsulating a hierarchical window clause and at least one expression containing a window function on a hierarchical window specified by the hierarchical window clause;
    constructing a directed acyclic graph of at least a portion of the rows in a windowed table based on the hierarchical window clause, wherein the unary structural grouping defines edges of the directed acyclic graph using a definition of covered tuples, wherein the definition of covered tuples allows for intermediate nodes to be bypassed;
    obtaining, based on the at least one expression encapsulated within the received query, results responsive to the query by accumulating data from the rows across edges of the directed acyclic graph, the obtaining reusing previous results to form part of the results responsive to the query when available; and
    providing data comprising at least a portion of the obtained results.

2. The method of claim 1, wherein the directed acyclic graph is explicitly constructed.

3. The method of claim 1, wherein the directed acyclic graph is not explicitly constructed.

4. The method of claim 1, wherein a separate node column of the single table identifies a position of each row in the hierarchy of nodes defining a structure of the hierarchy of nodes, wherein the hierarchical window clause specifies the node column whose row field contents represent the position of each row in the hierarchy of nodes, and wherein a structure of the directed acyclic graph is derived from the structure of the hierarchy of nodes.

5. The method of claim 4, wherein the hierarchical window clause further specifies direction of desired data flow across the constructed directed acyclic graph.

6. The method of claim 5, wherein the direction of desired data flow follows a direction of edges of the hierarchy of nodes.

7. The method of claim 5, wherein the direction of desired data flow follows a direction of inverted edges of the hierarchy of nodes.

8. The method of claim 5, wherein the data flow across the directed acyclic graph bypasses at least one intermediate node of the hierarchy of nodes.

9. The method of claim 1, wherein providing data comprises at least one of: persisting at least a portion of the obtained results, loading at least a portion of the obtained results into memory, transmitting at least a portion of the obtained results to a remote computing system, or displaying at least a portion of the obtained results in an electronic visual display.

10. The method of claim 1, wherein the query further specifies a window partition clause and the data stored in the hierarchy of nodes is partitioned according to the window partition clause, wherein the generated directed acyclic graph of the hierarchy of nodes is based on the partitioned data.

11. The method of claim 1, wherein the query is formulated in Structured Query Language (SQL).

12. The method of claim 1, wherein the query comprises a RECURSIVE keyword wrapping at least one expression having at least one window function over the hierarchical window.

13. The method of claim 1, wherein the database is a main-memory relational database management system.

14. The method of claim 13, wherein the database is a column-oriented in-memory database.

15. The method of claim 1, wherein the database is a distributed database in which data is stored across multiple computing systems.

16. A system comprising:
    at least one data processor; and
    memory storing instructions which, when executed by the at least one data processor, result in operations comprising:
        receiving, by a database, a query requesting data in the form of a single table in which each row of the single table is related to a different node of a hierarchy of nodes, the query providing for unary structural grouping with structural recursion in which each node acts as an input node and an output node, the received query encapsulating a hierarchical window clause and at least one expression containing a window function on a hierarchical window specified by the hierarchical window clause;
        constructing a directed acyclic graph of at least a portion of the rows in a windowed table based on the hierarchical window clause, wherein the unary structural grouping defines edges of the directed acyclic graph using a definition of covered tuples, wherein the definition of covered tuples allows for intermediate nodes to be bypassed;
        obtaining, based on the at least one expression encapsulated within the received query, results responsive to the query by accumulating data from the rows across edges of the directed acyclic graph; and
        providing data comprising at least a portion of the obtained results.

17. The system of claim 16, wherein the directed acyclic graph is explicitly constructed.

18. The system of claim 16, wherein the directed acyclic graph is not explicitly constructed.

19. The system of claim 16, wherein a separate node column of the single table identifies a position of each row in the hierarchy of nodes defining a structure of the hierarchy of nodes, wherein the hierarchical window clause specifies the node column whose row field contents represent the position of each row in the hierarchy of nodes, and wherein a structure of the directed acyclic graph is derived from the structure of the hierarchy of nodes.

20. A non-transitory computer program product storing instructions which, when executed by at least one data processor forming part of at least one computing system, result in operations comprising:
    receiving, by a database, a query requesting data in the form of a single table in which each row of the single table is related to a different node of a hierarchy of nodes, the query providing for unary structural grouping with structural recursion in which each node acts as an input node and an output node, the received query encapsulating a hierarchical window clause and at least one expression containing a window function on a hierarchical window specified by the hierarchical window clause;

constructing a directed acyclic graph of at least a portion of the rows in a windowed table based on the hierarchical window clause, wherein the unary structural grouping defines edges of the directed acyclic graph using a definition of covered tuples, wherein the definition of covered tuples allows for intermediate nodes to be bypassed;

obtaining, based on the at least one expression encapsulated within the received query, results responsive to the query by accumulating data from the rows across edges of the directed acyclic graph; and providing data comprising at least a portion of the obtained results.

* * * * *